US011703120B2

(12) United States Patent
Schindler

(10) Patent No.: US 11,703,120 B2
(45) Date of Patent: Jul. 18, 2023

(54) METHOD FOR CARRYING OUT A SHIFTING OPERATION IN A SEQUENTIAL MANUAL TRANSMISSION

(71) Applicant: Bayerische Motoren Werke Aktiengesellschaft, Munich (DE)

(72) Inventor: Patrick Schindler, Dieterheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 65 days.

(21) Appl. No.: 17/433,304

(22) PCT Filed: Feb. 13, 2020

(86) PCT No.: PCT/EP2020/053669
§ 371 (c)(1),
(2) Date: Aug. 24, 2021

(87) PCT Pub. No.: WO2020/177995
PCT Pub. Date: Sep. 10, 2020

(65) Prior Publication Data
US 2022/0136599 A1    May 5, 2022

(30) Foreign Application Priority Data
Mar. 4, 2019   (DE) .................... 10 2019 105 324.2

(51) Int. Cl.
*F16H 61/04* (2006.01)
*F16H 63/46* (2006.01)
*F16H 63/50* (2006.01)

(52) U.S. Cl.
CPC ......... *F16H 61/0403* (2013.01); *F16H 63/46* (2013.01); *F16H 63/502* (2013.01); *F16H 2306/54* (2013.01)

(58) Field of Classification Search
CPC .... F16H 61/0403; F16H 63/46; F16H 63/502; F16H 2306/54; B60W 10/02; B60W 10/06; B60W 10/11; B60W 30/19
See application file for complete search history.

(56) References Cited

U.S. PATENT DOCUMENTS

2003/0027683 A1     2/2003   Grillenberger et al.
2013/0289839 A1*   10/2013  Iizuka ................... B60W 30/19
                                                               701/54
(Continued)

FOREIGN PATENT DOCUMENTS

DE            101 35 327 A1    1/2003
DE     10 2004 029 076 A1      2/2006
(Continued)

OTHER PUBLICATIONS

International Search Report (PCT/ISA/210) issued in PCT Application No. PCT/EP2020/053669 dated May 29, 2020 with English translation (five (5) pages).
(Continued)

*Primary Examiner* — Edwin A Young
(74) *Attorney, Agent, or Firm* — Crowell & Moring LLP

(57) ABSTRACT

A method for carrying out a shifting operation in a sequential manual transmission, in particular a shifting claw transmission, is provided. During the shifting operation, a maximum clutch torque that can be transmitted by a clutch arranged between an engine and a transmission input shaft is automatically reduced without completely disengaging the clutch, and a rider-required drive torque is maintained in a manner which reduces undesired jerking movement of the vehicle due to sudden full clutch actuation.

10 Claims, 2 Drawing Sheets

(56) References Cited

U.S. PATENT DOCUMENTS

| | | | |
|---|---|---|---|
| 2014/0004999 A1* | 1/2014 | Iizuka | F16H 61/0437 |
| | | | 477/79 |
| 2014/0045652 A1* | 2/2014 | Carlson | F02P 9/005 |
| | | | 477/109 |
| 2016/0290500 A1 | 10/2016 | Ono et al. | |
| 2018/0178805 A1* | 6/2018 | Nakagawa | B60W 10/02 |

FOREIGN PATENT DOCUMENTS

| | | |
|---|---|---|
| EP | 1 031 769 A1 | 8/2000 |
| EP | 1 662 164 A2 | 5/2006 |
| WO | WO 2004/028850 A1 | 4/2004 |

OTHER PUBLICATIONS

German-language Written Opinion (PCT/ISA/237) issued in PCT Application No. PCT/EP2020/053669 dated May 29, 2020 (six (6) pages).

German-language Search Report issued in German Application No. 10 2019 105 324.2 dated Sep. 27, 2019 with partial English translation (12 pages).

\* cited by examiner

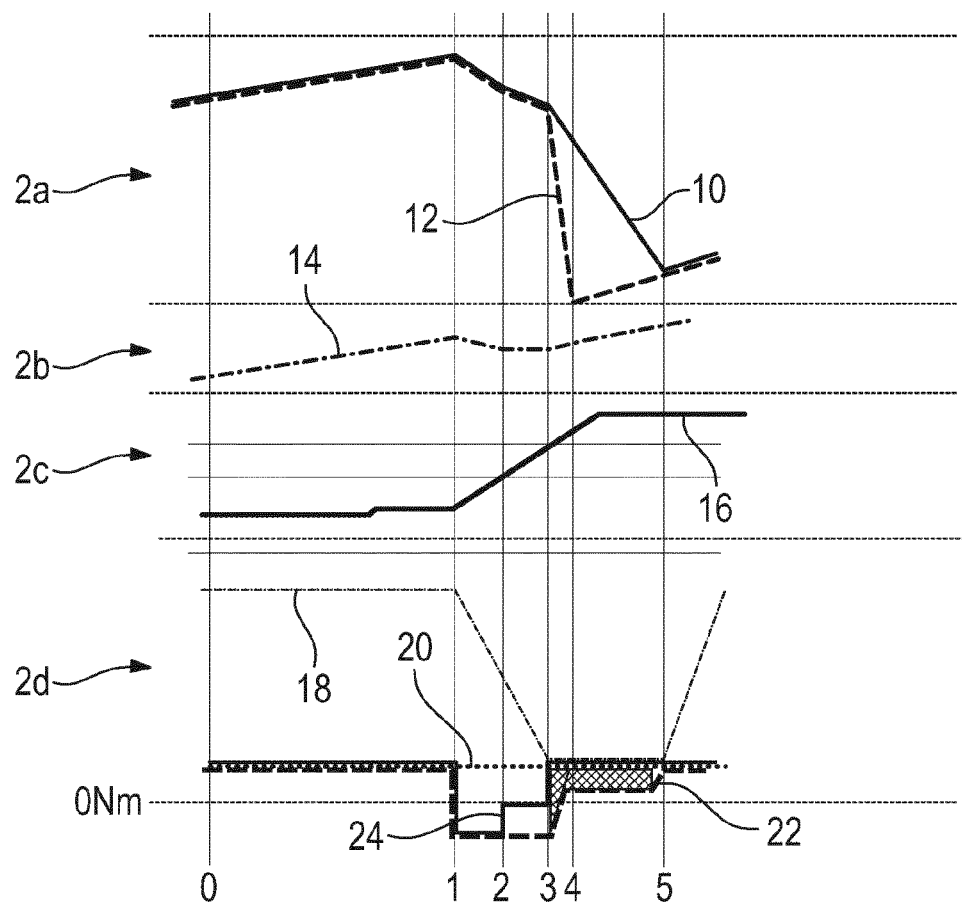

METHOD FOR CARRYING OUT A SHIFTING OPERATION IN A SEQUENTIAL MANUAL TRANSMISSION

BACKGROUND AND SUMMARY OF THE INVENTION

The invention relates to a method for carrying out a shifting operation in a sequential manual transmission.

Sequential manual transmissions are used predominantly in the case of motorcycles. In the case of a rapid shifting operation without clutch actuation, a brief, jerky vehicle acceleration occurs as a result of an incomplete rotational speed synchronization. This behavior leads to poor riding and/or shifting comfort.

In order to minimize the jerky vehicle acceleration, a rotational speed synchronization might be achieved by way of a traction interruption, that is to say by way of opening of the clutch between the engine and the transmission, or by way of a targeted stay without an engaged gear. This would lengthen the shifting times, however. As a result, the time period is increased, in which there is a traction force interruption, which is disadvantageous in the case of a two-wheeled vehicle application, because a rider cannot be supported as in the case of a passenger motor car on a driver's seat, but rather a direct reaction of the vehicle is desired for a comfortable riding feel.

For a shift which is free from a traction force interruption, systems with double clutch transmissions are known, but they are large and expensive.

It is therefore an object of the invention to specify a method for the improved performance of a shifting operation in a sequential manual transmission.

According to the invention, said object is achieved by way of a method for carrying out a shifting operation in a sequential manual transmission, in particular in a shifting claw transmission, a maximum transmissible clutch torque of a clutch which is arranged between an engine and a transmission input shaft being reduced automatically during the shifting operation, without opening the clutch completely. That is to say, the transmissible clutch torque is greater than zero at every time.

The torque which can at most be transmitted via the clutch is restricted by way of the reduction of the maximum transmissible clutch torque. As a result, a vehicle acceleration during the shifting operation can be limited, as a result of which riding and shifting comfort is improved. In particular, a jolt-free shift is possible.

The reduction of the maximum transmissible clutch torque takes place, for example, via a controller without a manual intervention, in particular in a manner which is directly or indirectly electrically controlled.

The clutch is, in particular, a non-positive clutch such as, for example, a friction clutch, in the case of which slip occurs from a defined, adjustable torque. In particular, a contact force between the friction disks of the clutch can be regulated by way of the controller, as a result of which the maximum transmissible clutch torque can be set.

A sequential transmission is understood to mean a transmission, in the case of which the individual gears are shifted one after another. That is to say, it is not possible for individual gears to be skipped.

One example of a sequential transmission is the shifting claw transmission, in the case of which a shifting operation into the next highest or next lowest gear takes place by way of the rotation of a shifting drum by a predefined angle. In the case of the rotation of the shifting drum, what are known as shifting claws are displaced, as a result of which one gear can be disengaged and a next highest or next lowest gear can be engaged. Here, the gear change takes place without rotational speed synchronization.

In accordance with one embodiment, the maximum transmissible clutch torque is set at the beginning of the shifting operation in such a way that it is greater than a current rider-required torque of the drive, which current rider-required torque is dependent on direct control of the drive torque or is specified indirectly via rider assistance systems. Therefore, the reduction of the maximum transmissible clutch torque does not result in any vehicle reaction, in particular does not result in a retardation and/or a traction force interruption, since the current engine torque can continue to be transmitted. The control operation of the drive torque can be controlled by the rider directly via a throttle twist grip, a hand-operated lever or a foot pedal, or can take place indirectly via a rider assistance system, such as, for example, a riding speed regulator.

The maximum transmissible clutch torque is preferably reduced to the rider-required torque until the non-positive engagement of a target gear. That is to say, at the time, at which the target gear is engaged, the maximum transmissible clutch torque is equal to the rider-required torque.

In the case of the engagement of the target gear, the engine rotational speed which has not yet been synchronized is pulled by way of the maximum transmissible clutch torque to a target rotational speed which is dependent on a transmission output rotational speed and the target transmission ratio. Since the maximum transmissible clutch torque by way of the partially open, in particular slipping clutch is restricted to the rider-required torque, a jerky vehicle acceleration is avoided. As a result, the shifting operation is particularly comfortable.

In particular, the maximum transmissible clutch torque is set to the rider-required torque during the entire duration of the engagement of a gear. In this way, an acceleration which corresponds to the rider requirement is already realized during the synchronization operation.

The maximum transmissible clutch torque preferably remains set to the value of the rider-required torque until the engine rotational speed is synchronized with a transmission input rotational speed, in particular until the rotational speed synchronization is concluded and there is no more slip via the clutch. In this way, an undesired speed increase as a result of the engine inertia cannot occur.

In accordance with one embodiment, an engine torque is automatically reduced as required, in order to make the rotational speed synchronization after the gear change possible.

The difference between the engine torque and the maximum transmissible clutch torque can be utilized for rotational speed synchronization.

The clutch is preferably automatically closed completely as soon as the engine rotational speed corresponds again to the transmission input rotational speed after a gear change, in particular the engine torque corresponds again to the rider-required torque. As a result, it can be ensured again after the gear change that no undesired clutch slip occurs.

In accordance with one embodiment, the maximum transmissible clutch torque is reduced automatically as soon as a shifting request is detected, in particular is either signaled directly by way of the rider or is initiated on account of a gear change automatic system. In this way, the transmissible clutch torque can be set in a particularly appropriate manner.

In accordance with one embodiment, the drive train is moved into a load-free state via a positive or negative variation of the drive engine torque, as soon as a shifting request of a rider is signaled, in order to make the disengagement of a gear possible. The engine torque is varied, for example, by way of ignition angle intervention, actuation of the throttle valve or mixture adaptation. As a result, it is made possible that the current gear can be disengaged by way of reasonable effort, in particular since, as a result, the shifting claws of a shifting claw clutch can be released more easily. Without a load change in the drive train, the disengagement of the gear is not possible or is possible only with a great effort.

A gear change is preferably carried out by way of actuation of an actuator or by way of a force which is introduced by the rider. For example, a rider can bring about the gear change via a shifting pedal.

Further advantages and features result from the following description and from the following drawings.

BRIEF DESCRIPTION OF THE DRAWINGS

FIG. 2 shows a diagram for illustrating a method according to an embodiment of the present invention for carrying out a shifting operation.

DETAILED DESCRIPTION OF THE DRAWINGS

Figure 1:
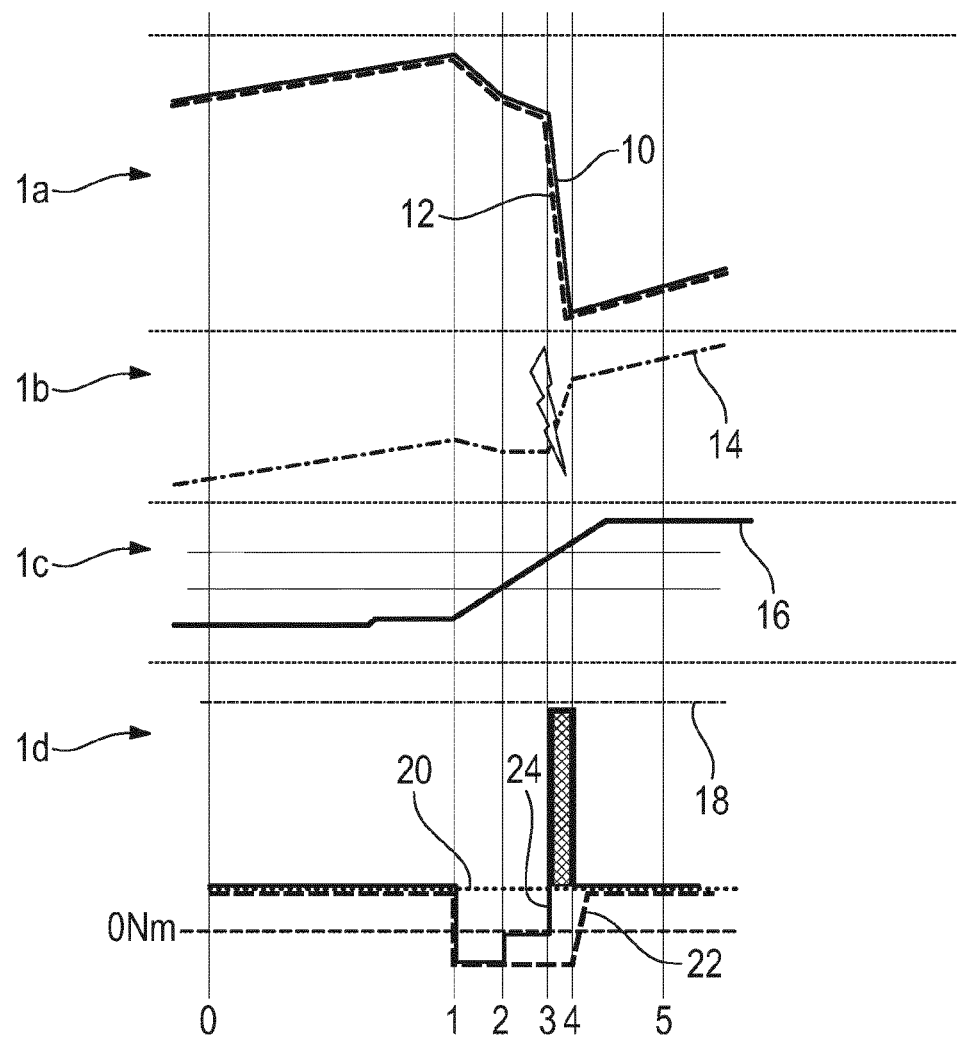
FIG. 1 shows a diagram for illustrating a known shifting operation in a sequential manual transmission.

FIG. 1 illustrates the process of a method for carrying out a shifting operation in the case of an upshift from a gear X into a gear X+1 in a sequential manual transmission such as, for example, a shifting claw transmission. The shifting operation can take place in an automated, partially automated or manual manner. In particular, the shifting operation takes place without a clutch actuation.

Sequential manual transmissions are well known to a person skilled in the art, and a detailed description will therefore be dispensed with.

In FIG. 1, the process of the method is divided into a plurality of time periods. Here, the progressions of various parameters are shown diagrammatically.

Normal riding operation takes place from time 0 until time 1, that is to say the rider accelerates the vehicle while a gear X is engaged, in particular without shifting into a next highest or next lowest gear.

An engine rotational speed 10, the progression of which is illustrated in portion 1a of FIG. 1, increases from time 0 until time 1 in accordance with the acceleration which is set by the rider via a throttle actuation. A transmission input rotational speed 12 runs parallel to the engine rotational speed 10. The engine rotational speed 10 and the transmission input rotational speed 12 are identical, since an engine output shaft (not shown) is coupled fixedly to a transmission input shaft (likewise not shown) for conjoint rotation, in particular by means of a friction clutch.

In portion 1b, a vehicle speed 14 is illustrated which likewise increases in accordance with the acceleration which is set by the rider, for example, via a throttle twist grip.

Portion 1c shows a shifting drum angle 16 of a shifting drum (not shown) of the sequential manual transmission. The shifting drum can be rotated by a predefined angular range for shifting into a next highest or next lowest gear. If no shifting operation takes place, the shifting drum remains in its position, and the shifting drum angle remains constant, as is shown in graph 1c from time 0 to 1. From time 0 until time 1, the shifting drum is prestressed, and the gear X cannot be disengaged on account of a claw undercut in combination with a prevailing engine torque.

Portion 1d illustrates a maximum transmissible clutch torque 18, a rider-required torque 20, an engine torque 22 and an effective clutch torque 24. The effective clutch torque 24 is the torque which is transmitted by the sequential manual transmission and its transmission ratio to the wheels of a vehicle, to the rear wheel in the case of a motorcycle.

The maximum transmissible clutch torque 18 is dependent on the clutch between the motor output shaft and the transmission input shaft, and is constant as long as the clutch is closed completely, as is always the case in the method which is illustrated in FIG. 1.

The driver-required torque 20, the engine torque 22 and the effective clutch torque 24 are identical in the time period from time 0 until time 1.

At time 1, the rider signals a shifting request, for example by way of actuation of an actuator or a shifting pedal.

By the rider actuating the actuator or the shifting pedal, the shifting drum is rotated by a predefined angular range, as a result of which the shifting drum angle is increased, as can be seen in portion 1c of FIG. 1.

As soon as the rider signals a shifting request, the engine torque 22 and the engine rotational speed 10 are reduced automatically, in order to make the disengagement of the gear X possible.

The disengagement of the gear takes place from time 1 until time 2, the claws of the shifting claw transmission still being in engagement until time 2.

The reduction of the engine torque 22 is achieved, for example, by way of a change of the ignition angle intervention, actuation of the throttle flap or a mixture adaptation, in particular an injection suppression. Here, the effective clutch torque 24 is reduced at the same time, and, in particular, the effective clutch torque 24 becomes briefly negative, as can be seen in portion 1d of FIG. 1. This results in a brief vehicle retardation.

No gear is engaged from time 2 until time 3, that is to say there is no traction and the effective clutch torque 24 is zero. The claws of the shifting claw transmission are out of engagement. The vehicle speed 14 remains as far as possible constant during this phase.

At time 3, the next highest gear X+1 is engaged. Since the engine rotational speed 10 has not yet been synchronized to the target rotational speed of the next highest gear X+1, the engine rotational speed 10 is pulled in a jerky manner to the corresponding rotational speed of the next highest gear X+1 in the case of the engagement of the gear X+1. On account of the engine inertia, this sudden torque adaptation leads to a jerky rise of the vehicle speed 14, as can be seen in portion 1b.

At time 4, the engagement of the gear X+1 is concluded. The effective clutch torque 24 is set again to the rider-required torque 20.

The jerky rise of the vehicle speed 14 which occurs in the time period from time 3 until time 4 is perceived as uncomfortable by the rider, and is undesired.

In order to avoid said jerky rise of the vehicle speed 14, the maximum transmissible clutch torque 18 of the clutch which is arranged between the motor and the transmission input shaft is automatically reduced according to the invention during the shifting operation. This is achieved by the contact force of the clutch linings being reduced, without the clutch starting to slip as a result.

This is illustrated in the following text in FIG. 2. For the sake of simplicity and in order to avoid repetition, the differences from the known shifting method are described in the following text.

It can be seen in portion 2a of FIG. 2 that the engine rotational speed 10 and the transmission input rotational speed 12 are now no longer coupled to one another, since the clutch now passes into a slipping state as a result of the reduced maximum transmissible clutch torque 18 of said clutch between the engine and the transmission input.

The reduction of the contact force of the clutch preferably takes place in a directly or indirectly electrically controlled manner.

The maximum transmissible clutch torque 18 is reduced by way of the reduction of the contact force of the clutch, which is illustrated in portion 2d of FIG. 2.

In particular, from time 1, at which a shifting request is detected, the maximum transmissible clutch torque 18 is reduced automatically. The reduction of the maximum transmissible clutch torque 18 takes place during the disengagement of the gear X and during the time phase, in which no gear is engaged.

During the disengagement of the gear X, the maximum transmissible clutch torque 18 is always greater than the rider-requested torque 20 which is specified directly by the rider via the throttle twist grip or indirectly via rider assistance systems.

At time 3, at which the next highest gear X+1 is engaged, the maximum transmissible clutch torque 18 is set to the driver-required torque 20. This state is maintained during the duration of the engagement of the gear X+1. The engine rotational speed 10 which has not yet been synchronized is also pulled to the new target rotational speed here, as has already been described in conjunction with FIG. 1. Since, however, the maximum transmissible clutch torque is restricted according to the invention, a jerky rise of the vehicle speed 14 in the case of the engagement of the gear X+1 is avoided, and an acceleration which corresponds to the rider's request is realized.

The difference between the engine torque 22 and the maximum transmissible clutch torque 18 is utilized for rotational speed synchronization after the engagement of the gear X+1.

As soon as the engine rotational speed 10 is synchronized to the target rotational speed, the clutch is closed completely, and the maximum transmissible clutch torque 18 is increased again. The closure of the clutch preferably takes place automatically.

The desired torque at the output is reached particularly rapidly by way of the rotational speed synchronization with a targeted restriction of the maximum transmissible clutch torque, which restriction is dependent on the rider requirement, and the shift is perceived as jolt-free by a rider.

What is claimed is:

1. A method for carrying out a shifting operation in a sequential manual transmission having a single clutch between the transmission and an engine, comprising the act of:
automatically reducing during the shifting operation a maximum transmissible clutch torque of the single clutch arranged between the engine and a transmission input shaft, without complete opening of the clutch.

2. The method according to claim 1, further comprising the act of:
setting at a beginning of the shifting operation the maximum transmissible clutch torque to be greater than a current rider-required torque, the current rider-required torque being one of a direct control drive torque set by a rider or a drive torque set indirectly by a rider assistance system.

3. The method according to claim 2, wherein
the maximum transmissible clutch torque is reduced to the rider-required torque until a non-positive engagement of a target gear.

4. The method according to claim 3, wherein
the maximum transmissible clutch torque is set to the rider-required torque during the entire duration of the engagement of the target gear.

5. The method according to claim 4, wherein
the maximum transmissible clutch torque remains set to the rider-required torque until an engine rotational speed is synchronized with a transmission input rotational speed.

6. The method according to claim 5, further comprising the act of:
automatically reducing an engine torque to achieve rotational speed synchronization after completing engagement of the target gear.

7. The method according to claim 6, wherein
a difference between the engine torque and the maximum transmissible clutch torque is utilized for rotational speed synchronization.

8. The method according to claim 7, wherein
the clutch is automatically closed completely as soon as the engine rotational speed corresponds to the transmission input rotational speed after the target gear change.

9. The method according to claim 1, wherein
the maximum transmissible clutch torque is reduced automatically as soon as a shifting request is detected.

10. The method according to claim 9, wherein
the shifting request is initiated by a force introduced by the rider to a gear shift mechanism or a force introduced by a gear shift actuator.

\* \* \* \* \*